April 10, 1928.                J. G. CHAMBERS ET AL           1,665,949
                                    WATER HEATER
                              Filed Aug. 27, 1926           2 Sheets-Sheet 1

James G. Chambers
William Salamis
INVENTORS

BY Victor J. Evans
ATTORNEY

WITNESS:

April 10, 1928.
J. G. CHAMBERS ET AL
1,665,949
WATER HEATER
Filed Aug. 27, 1926   2 Sheets-Sheet 2
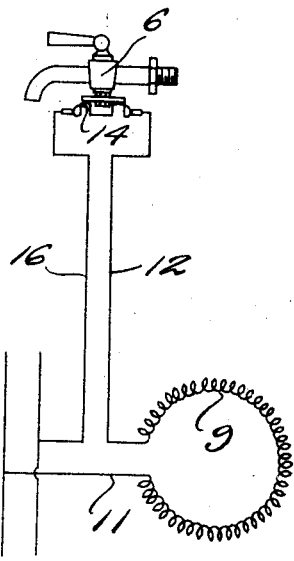
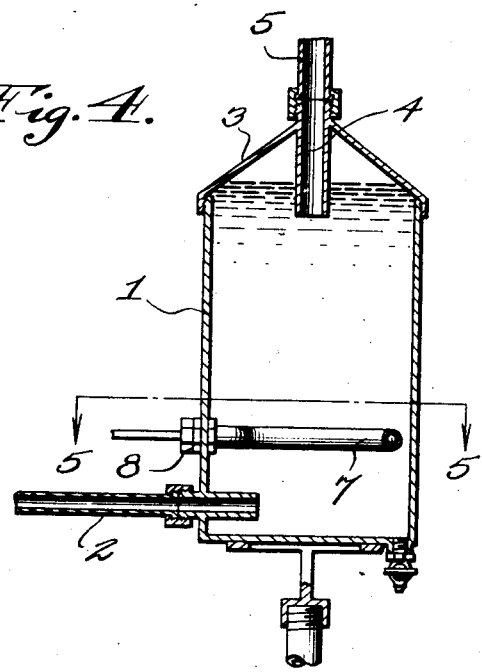
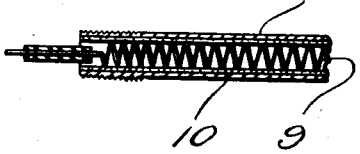
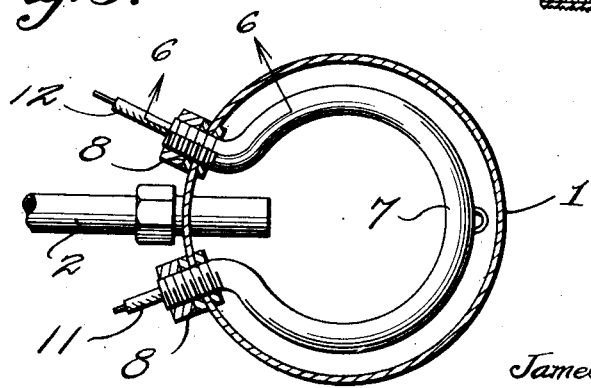
James G. Chambers
William Salamis
INVENTORS
BY Victor J. Evans
ATTORNEY
WITNESS:

Patented Apr. 10, 1928.

1,665,949

UNITED STATES PATENT OFFICE.

JAMES G. CHAMBERS AND BASIL C. SALAMIS, OF MONTREAL, QUEBEC, CANADA.

WATER HEATER.

Application filed August 27, 1926. Serial No. 132,024.

This invention relates to means for heating water by electricity, the general object of the invention being to provide means for closing a circuit to an electric core arranged in a water tank when a spigot is opened to permit some of the water to pass from the tank, so as to heat the water in the tank.

This invention also consists in certain other features of construction and in the combination and arrangement of the several parts, to be hereinafter fully described, illustrated in the accompanying drawings and specifically pointed out in the appended claim.

In describing our invention in detail, reference will be had to the accompanying drawings wherein like characters denote like or corresponding parts throughout the several views, and in which:—

Figure 4 is a longitudinal sectional view through the tank.

Figure 5 is a section on line 5—5 of Figure 4.

Figure 6 is a section on line 6—6 of Figure 5.

Figure 7 is a diagrammatic view of the circuit.

Figure 1:
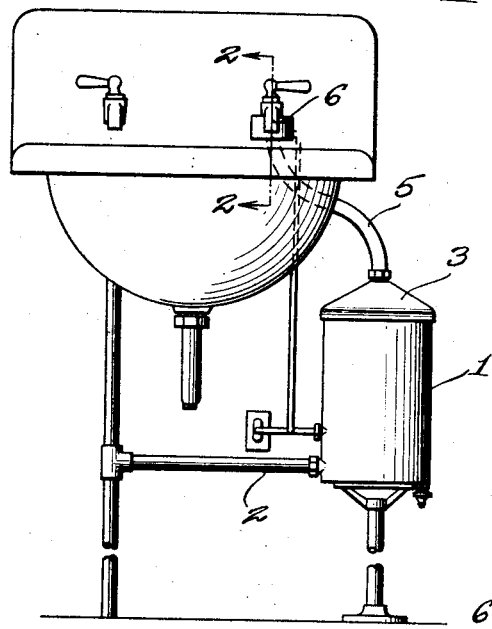
Figure 1 is a view showing the invention in use.
Figure 3:
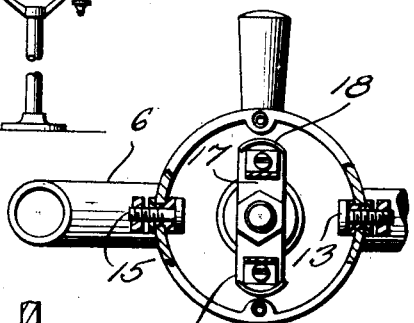
Figure 3 is a section on line 3—3 of Figure 2, but showing the cock closed and the switch opened.
Figure 2:
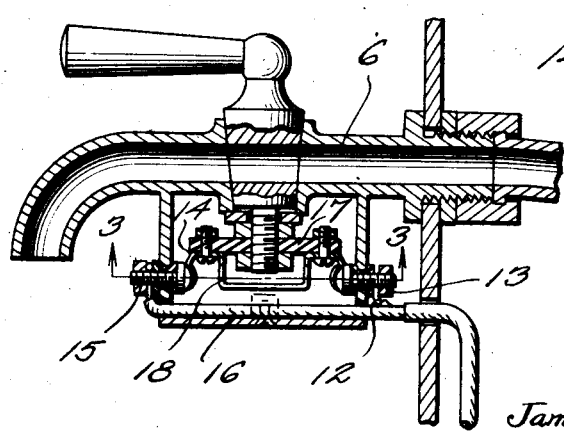
Figure 2 is a section on line 2—2 of Figure 1, but showing the cock open and the switch closed.

In these views, 1 indicates a water tank which is connected with a source of supply by a pipe 2 which enters the lower part of the tank. The tank is covered by a conical shaped cap 3 which is threaded to the tank and has a discharge nipple 4 at its center which extends into the tank a considerable distance so as to leave an air space in the top of the tank. As shown, the nipple is formed integral with the cap. A pipe 5 connects the nipple with a spigot 6. A curved pipe 7 is arranged in the tank 1 with its ends passing through the tank, said ends being threaded to receive the nuts 8 which hold the pipe in place. An electric coil 9 is arranged in the pipe 6 and is suitably insulated therefrom, as shown at 10. One end of this coil is connected by a conductor 11 with a source of supply and its other end is connected by a conductor 12 with a terminal 13 of a switch 14 which is carried by the spigot. The other terminal 15 of the switch is connected by the conductor 16 with the return line of the circuit. A block 17 of insulating material is connected with the bottom part of the valve plug so that it will move with the plug and this block carries the movable part 18 of the switch which, when the plug is in open position, will bridge the terminals 13 and 15 and thus complete the circuit to the coil and thereby furnish heat to heat the water in the tank. When the plug is in closed position, the switch will be in open position so that no current will flow to the coil.

From the foregoing, it will be seen that we have provided simple means whereby warm water will flow from the spigot when the same is opened, due to the closing of an electric circuit to a heating coil in the tank when the spigot is in open position. As soon as the spigot is closed, the circuit will be broken.

While we have shown the device associated with a wash basin, it will, of course, be understood that it could be used in other situations.

It is thought from the foregoing description that the advantages and novel features of our invention will be readily apparent.

We desire it to be understood that we may make changes in the construction and in the combination and arrangement of the several parts, provided that such changes fall within the scope of the appended claim.

What we claim is:—

A device of the class described comprising a tank, a conical cap threaded to the tank, a discharge nipple formed integral with the upper end of the tank and passing through the same to a point well within the tank so as to form an air space in the conical space at the top of the tank, means for connecting the bottom of the tank to a source of supply and control means in the outer end of the discharge pipe and means for heating the water in the tank.

In testimony whereof we affix our signatures.

JAMES G. CHAMBERS.
B. C. SALAMIS.